US007206417B2

(12) United States Patent
Nathan

(10) Patent No.: US 7,206,417 B2
(45) Date of Patent: Apr. 17, 2007

(54) WIRELESS DIGITAL TRANSMISSION SYSTEM FOR LOUDSPEAKERS

(75) Inventor: Guy Nathan, Yerres (FR)

(73) Assignee: Touchtunes Music Corporation, Las Vegas, NV (US)

( * ) Notice: Subject to any disclaimer, the term of this patent is extended or adjusted under 35 U.S.C. 154(b) by 0 days.

(21) Appl. No.: 11/023,390

(22) Filed: Dec. 29, 2004

(65) Prior Publication Data

US 2005/0111671 A1 May 26, 2005

Related U.S. Application Data

(63) Continuation of application No. 09/161,584, filed on Sep. 28, 1998, now abandoned.

(30) Foreign Application Priority Data

Sep. 26, 1997 (FR) .................................. 97 12007

(51) Int. Cl.
*H04B 3/00* (2006.01)

(52) U.S. Cl. .......................... 381/77; 381/81; 375/281; 340/310.12

(58) Field of Classification Search .................. 381/77, 381/78–85; 340/310.01, 310.02, 310.11, 340/310.12
See application file for complete search history.

(56) References Cited

U.S. PATENT DOCUMENTS

| | | |
|---|---|---|
| 3,982,620 A | 9/1976 | Kortenhaus |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,412,292 A | 10/1983 | Sedam |
| 4,521,014 A | 6/1985 | Sitrick |
| 4,528,643 A | 7/1985 | Freeny |
| 4,558,413 A | 12/1985 | Schmidt |

(Continued)

FOREIGN PATENT DOCUMENTS

| | | |
|---|---|---|
| AU | 199954012 | 4/2000 |

(Continued)

OTHER PUBLICATIONS

Patent Abstract of Japan vol. 95, No. 010 & JP 07 281682 A (Naguo Yuasa), Oct. 27 1 JP 07 281682, figure 1-6 abrége.

(Continued)

*Primary Examiner*—Brian T. Pendleton
(74) *Attorney, Agent, or Firm*—Nixon & Vanderhye P.C.

(57) ABSTRACT

This invention relates to a wireless digital transmission system for loudspeakers comprising:

compression means for the file representing the digital audio signal of the "compact disc" type, a transmission device comprising means of converting this compressed signal into a series signal moving by packets going to a modulator circuit with phase quadrature and means of transmitting the signals exiting the modulator circuit with phase quadrature to the domestic network for feeding electricity;

a receiving device comprising means of connecting to this domestic network and of extracting from the feed electrical signal, by a demodulator with phase quadrature, data packets moving the digital audio signal to convert it into a parallelized digital signal sent to a decompression circuit;

means of converting the decompressed digital signals into an analog signal intended to feed a loudspeaker after adequate amplification.

8 Claims, 2 Drawing Sheets

U.S. PATENT DOCUMENTS 4,572,509 A 2/1986 Sitrick
4,582,324 A 4/1986 Koza
4,593,904 A 6/1986 Graves
4,597,058 A 6/1986 Izumi
4,636,951 A 1/1987 Harlick
4,652,998 A 3/1987 Koza
4,654,799 A 3/1987 Ogaki
4,658,093 A 4/1987 Hellman
4,667,802 A 5/1987 Verduin
4,675,538 A 6/1987 Epstein
4,677,311 A 6/1987 Morita
4,677,565 A 6/1987 Ogaki
4,703,465 A 10/1987 Parker
4,704,804 A 11/1987 Leal
4,722,053 A 1/1988 Dubno
4,761,684 A 8/1988 Clark
4,766,581 A 8/1988 Korn
4,787,050 A 11/1988 Suzuki
4,792,849 A 12/1988 McCalley
4,811,325 A 3/1989 Sharples
4,825,054 A 4/1989 Rust
4,829,570 A 5/1989 Schotz
4,868,832 A 9/1989 Marrington
4,920,432 A 4/1990 Eggers
4,922,420 A 5/1990 Nakagawa
4,924,378 A 5/1990 Hershey
4,926,485 A 5/1990 Yamashita
4,937,807 A 6/1990 Weitz
4,949,187 A 8/1990 Cohen
4,956,768 A 9/1990 Sidi
4,958,835 A 9/1990 Tashiro
4,999,806 A 3/1991 Chernow
5,012,121 A 4/1991 Hammond
5,041,921 A 8/1991 Scheffler
5,058,089 A 10/1991 Yoshimara
5,138,712 A 8/1992 Corbin
5,155,847 A 10/1992 Kirouac
5,163,131 A 11/1992 Row
5,166,886 A 11/1992 Molnar
5,191,573 A 3/1993 Hair
5,191,611 A 3/1993 Lang
5,192,999 A 3/1993 Graczyk
5,197,094 A 3/1993 Tillery
5,203,028 A 4/1993 Shiraishi
5,237,157 A 8/1993 Kaplan
5,237,322 A 8/1993 Heberle
5,239,480 A 8/1993 Huegel
5,250,747 A 10/1993 Tsumura
5,252,775 A 10/1993 Urano
5,260,999 A 11/1993 Wyman
5,262,875 A 11/1993 Mincer
5,276,866 A 1/1994 Paolini
5,289,476 A * 2/1994 Johnson et al. ............. 714/775
5,315,161 A 5/1994 Robinson
5,339,413 A 8/1994 Koval
5,341,350 A 8/1994 Frank
5,355,302 A 10/1994 Martin
5,357,276 A 10/1994 Banker
5,369,778 A 11/1994 SanSoucie
5,375,206 A 12/1994 Hunter
5,406,634 A * 4/1995 Anderson et al. ............. 381/82
5,418,713 A 5/1995 Allen
5,420,923 A 5/1995 Beyers
5,428,252 A 6/1995 Walker
5,431,492 A 7/1995 Rothschild
5,445,295 A 8/1995 Brown
5,455,926 A 10/1995 Keele
5,457,305 A 10/1995 Akel
5,465,213 A 11/1995 Ross
5,475,835 A 12/1995 Hickey
5,481,509 A 1/1996 Knowles
5,495,610 A 2/1996 Shing
5,496,178 A 3/1996 Back
5,499,921 A 3/1996 Sone
5,511,000 A 4/1996 Kaloi
5,513,117 A 4/1996 Small
5,548,729 A 8/1996 Akiyoshi
5,550,577 A 8/1996 Verbiest
5,554,968 A 9/1996 Lee
5,555,244 A 9/1996 Gupta
5,557,541 A 9/1996 Schulhof
5,559,505 A 9/1996 McNair
5,559,549 A 9/1996 Hendricks
5,561,709 A 10/1996 Remillard
5,566,237 A 10/1996 Dobbs
5,570,363 A 10/1996 Holm
5,583,994 A 12/1996 Rangan
5,592,551 A 1/1997 Lett
5,594,509 A 1/1997 Florin
5,612,581 A 3/1997 Kageyama
5,613,909 A 3/1997 Stelovsky
5,619,247 A 4/1997 Russo
5,619,698 A 4/1997 Lillich
5,623,666 A 4/1997 Pike
5,636,276 A * 6/1997 Brugger ....................... 705/54
5,642,337 A 6/1997 Oskay
5,644,714 A 7/1997 Kikinis
5,644,766 A 7/1997 Coy
5,668,592 A 9/1997 Spaulding
5,668,788 A 9/1997 Allison
5,684,716 A 11/1997 Freeman
5,691,778 A 11/1997 Song
5,697,844 A 12/1997 Von Kohorn
5,703,795 A 12/1997 Mankowitz
5,708,811 A 1/1998 Arendt
5,712,976 A 1/1998 Falcon
5,726,909 A 3/1998 Krikorian
5,734,719 A 3/1998 Tsevdos
5,757,936 A * 5/1998 Lee ............................ 381/77
5,761,655 A 6/1998 Hoffman
5,762,552 A 6/1998 Vuong
5,774,668 A 6/1998 Choquier
5,774,672 A 6/1998 Funahashi
5,781,889 A 7/1998 Martin
5,790,172 A 8/1998 Imanaka
5,790,671 A 8/1998 Cooper
5,790,856 A 8/1998 Lillich
5,793,980 A 8/1998 Glaser
5,798,785 A 8/1998 Hendricks
5,802,599 A 9/1998 Cabrera
5,808,224 A 9/1998 Kato
5,809,246 A 9/1998 Goldman
5,832,024 A 11/1998 Schotz et al.
5,832,287 A 11/1998 Atalla
5,835,843 A 11/1998 Haddad
5,845,104 A 12/1998 Rao
5,848,398 A 12/1998 Martin
5,854,887 A 12/1998 Kindell
5,862,324 A 1/1999 Collins
5,864,870 A 1/1999 Guck
5,867,714 A 2/1999 Todd
5,884,028 A 3/1999 Kindell
5,884,298 A 3/1999 Smith
5,887,193 A 3/1999 Takahashi
5,913,040 A 6/1999 Rakavy
5,915,094 A 6/1999 Kouloheris
5,915,238 A 6/1999 Tjaden
5,917,537 A 6/1999 Lightfoot
5,917,835 A 6/1999 Barrett
5,923,885 A 7/1999 Johnson
5,930,765 A 7/1999 Martin
5,931,908 A 8/1999 Gerba
5,949,688 A 9/1999 Montoya
5,953,429 A 9/1999 Wakai et al.

| | | | | |
|---|---|---|---|---|
| 5,959,869 | A | 9/1999 | Miller | |
| 5,959,945 | A | 9/1999 | Kleiman | |
| 5,966,495 | A | 10/1999 | Takahashi | |
| 5,978,855 | A | 11/1999 | Metz | |
| 6,002,720 | A | 12/1999 | Yurt | |
| 6,009,274 | A | 12/1999 | Fletcher | |
| 6,018,337 | A | 1/2000 | Peters | |
| 6,018,726 | A | 1/2000 | Tsumura | |
| 6,072,982 | A | 6/2000 | Haddad | |
| 6,151,634 | A | 11/2000 | Glaser | |
| 6,407,987 | B1 * | 6/2002 | Abraham | 370/295 |

FOREIGN PATENT DOCUMENTS

| | | | |
|---|---|---|---|
| DE | 3723737 | A1 | 1/1988 |
| DE | 3820835 | A1 | 1/1989 |
| DE | 4244198 | | 6/1994 |
| DE | 19610739 | | 9/1997 |
| EP | A0082077 | | 6/1983 |
| EP | 0140593 | A2 | 5/1985 |
| EP | 0256921 | | 2/1988 |
| EP | 0283304 | | 9/1988 |
| EP | A 0283350 | | 9/1988 |
| EP | 0309298 | | 3/1989 |
| EP | A 0313359 | | 4/1989 |
| EP | 0340787 | | 11/1989 |
| EP | 0363186 | | 4/1990 |
| EP | 0 425 168 | A | 5/1991 |
| EP | 0464562 | A2 | 1/1992 |
| EP | 0480558 | | 4/1992 |
| EP | 0498130 | | 8/1992 |
| EP | 0498130 | A2 | 8/1992 |
| EP | 0 507 110 | | 10/1992 |
| EP | 0538319 | B1 | 4/1993 |
| EP | A 0631283 | | 12/1994 |
| EP | 0632371 | | 1/1995 |
| EP | 0786122 | B1 | 7/1997 |
| EP | 0817103 | | 1/1998 |
| EP | 0841616 | A2 | 5/1998 |
| EP | 0919964 | | 6/1999 |
| EP | 0959570 | A1 | 11/1999 |
| EP | 0 974896 | A1 | 1/2000 |
| EP | 0982695 | | 3/2000 |
| FR | A 2602352 | | 2/1988 |
| GB | A 2122799 | | 1/1984 |
| GB | 2166328 | A | 4/1986 |
| GB | 2170943 | | 8/1986 |
| GB | 2193420 | | 2/1988 |
| GB | 2 238680 | A | 6/1991 |
| GB | 2259398 | | 3/1993 |
| GB | 2262170 | A | 6/1993 |
| JP | 57-173207 | | 10/1982 |
| JP | 58-179892 | | 10/1983 |
| JP | 60-253082 | | 12/1985 |
| JP | 62-192849 | | 8/1987 |
| JP | 62-284496 | | 12/1987 |
| JP | 63-60634 | | 3/1988 |
| JP | 2-153665 | | 6/1990 |
| JP | 5-74078 | | 3/1993 |
| JP | 07281682 | | 10/1995 |
| JP | 08-279235 | | 10/1996 |
| JP | 10-098344 | | 4/1998 |
| WO | WO 86 01326 | A | 2/1986 |
| WO | WO A 90 07843 | | 7/1990 |
| WO | WO 91/08542 | | 6/1991 |
| WO | WO A 91 20082 | | 12/1991 |
| WO | WO 93/16557 | | 8/1993 |
| WO | WO A 93 18465 | | 9/1993 |
| WO | WO A 94 03894 | | 2/1994 |
| WO | WO 94/14273 | | 6/1994 |
| WO | WO 94/15306 | | 7/1994 |
| WO | WO 94 15416 | A | 7/1994 |
| WO | WO 95 03609 | A | 2/1995 |
| WO | 95/29537 | | 11/1995 |
| WO | 96/12256 | | 4/1996 |
| WO | WO 96/12255 | | 4/1996 |
| WO | WO 96/12257 | | 4/1996 |
| WO | WO 96 12258 | A | 4/1996 |
| WO | WO 01/00290 | | 1/2001 |

OTHER PUBLICATIONS

Bonczck, Robert H. et al, "The DSS Development System", 1983 National Computer Conference, Anaheim, California, May 16-19, 1983, pp. 441-455.

IBM Technical Disclosure Bulletin, vol. 30, No. 5, Oct. 1987, "Method for Automated Assembly of Software Versions", pp. 353-355.

"Robotic Wafer Handling System for Class 10 Environments" IBM Technical Disclosure Bulletin, vol. 32, No. 9A, Feb. 1990, pp. 141-143.

"High-speed Opens and Shorts Substrate Tester", IBM Technical Disclosure Bulletin, vol. 33, No. 12, May 1991, pp. 251-259.

"Darts Revolution Again", Replay Magazine, Mar. 1991, pp. 146-148.

Galen A. Grimes, "Chapter 18, Taking Advantage or Web-based Audio." .

Petri Koskelainem "Report on Streamworks™" .

W. Richard Stevens, "TCP/IP Illustrated: vol. 1, the Protocols" .

Nowell Outlaw "Virtual Servers Offer Performance benefits for Networks Imaging" .

* cited by examiner

WIRELESS DIGITAL TRANSMISSION SYSTEM FOR LOUDSPEAKERS

This application is a continuation of application Ser. No. 09/161,584, filed Sep. 28, 1998, now abandoned the entire content of which is hereby incorporated by reference in this application.

BACKGROUND OF THE INVENTION

This invention relates to a wireless digital transmission system for loudspeakers.

Some wireless loudspeaker systems are known in which an analog audio signal is converted into a frequency modulated signal, this frequency modulated signal being transmitted over the alternating current feeders of a household network. The signal received by the domestic network is then reconverted into an audio signal after extraction of the modulated frequency signal.

Such a teaching is disclosed in particular by patent U.S. Pat. No. 4,829,570. This patent further envisions the use of a compression device to make it possible to compress analog signals delivered by a compact disc reader whose wide dynamic range requires a very wide passband to make the frequency modulated transmission possible. The wide band and the significant deviations pose numerous problems that are solved in this document by the use of a compression circuit to reduce the total dynamic range of the audio signal. This document makes it possible for us already to become aware of a first difficulty, which is the limitation of stereophonic systems, especially using frequency modulation and operating with analog systems such as variable frequency oscillators.

When it is desired to improve simple stereophonic quality to stereophonic quality of the "digital CD" type, the amount of data to be transmitted is such that the passband very quickly limits the frequency modulation.

Finally, this type of system taught by patent U.S. Pat. No. 4,829,570 is acceptable for use for private purposes on the domestic network of a personal residence but can be difficult to implement in a building or even less in communities or commercial groupings. In fact, the music broadcast on the feeder network will be picked up at the same instant by all the loudspeakers installed and connected to the network. This poses a problem in the payment of royalties and it is thus desirable to provide a device that makes it possible to avoid general distribution.

Finally, such a device requires, to have the two stereophonic channels, providing a first carrier frequency for the first channel and a second carrier frequency for the second channel. These frequencies will have to be selected according to very precise conditions, which will also limit the passband possibilities.

SUMMARY OF THE INVENTION

A first object of the invention is to propose a wireless digital transmission system for loudspeakers that makes it possible to broadcast stereophonic signals of digital compact disc quality and/or to have remote control.

This first object is achieved by the fact that the wireless digital transmission system for loudspeakers comprises:

- compression means for the file representing the digital audio signal of the "compact disc" type, a transmission device comprising means of converting this compressed signal into a series signal moving by packets going to a modulator circuit with phase quadrature and means of transmitting the signals exiting the modulator circuit with phase quadrature to the domestic network for feeding electricity;
- a receiving device comprising means of connecting to this domestic network and of extracting from the fed electrical signal, by a demodulator with phase quadrature, the data packets moving the digital audio signal to convert it into a parallelized digital signal sent to a decompression circuit;
- means of converting the decompressed digital signals into an analog signal intended to feed a loudspeaker after adequate amplification.

A second object is to make it possible to transmit several musical signals intended for different loudspeakers.

This object is achieved by the fact that the serialization means comprise means of inserting a destination address into the packets of serialized signals; and in that the reception means comprise means of comparing the address appearing in the packet received with the specific address at the receiving device to which the loudspeaker is connected.

According to another feature, the serialization device comprises means of multiplexing several fields of digital files representing a different audio signal intended for different addresses.

Another object of the invention is to propose a system that makes it possible to assure that royalties cannot be violated.

This third object is achieved by the fact that the transmission circuits comprise an encryption circuit and the connected receiving device comprises a decryption circuit using a secret key stored in the memory of the deserialization circuit.

According to another feature, the data from the digital signal are serialized according to a protocol comprising a first part consisting of protocol data, a second part consisting of the address of the recipient, a third part consisting of the digital signal or the multiplexed digital signals, and a fourth part consisting of end-of-protocol data.

According to another feature, the protocol comprises a fifth part consisting of control data for the loudspeakers.

According to another feature, the protocol comprises a sixth part consisting of at least one encryption key.

According to another feature, the system comprises means for including control commands in the series signal moving by packet, making it possible to have individual control of each loudspeaker.

According to another feature, the system comprises means of converting an analog signal to a digital signal, placed upstream from the means of compressing the file representing the audio signal, when the audio signal to be transmitted is of the analog type.

BRIEF DESCRIPTION OF THE FIGURES

Other features and advantages of this invention will appear more clearly from reading the following description made with reference to the attached drawings in which.

DETAILED DESCRIPTION OF THE PREFERRED EMBODIMENTS

Figure 1:
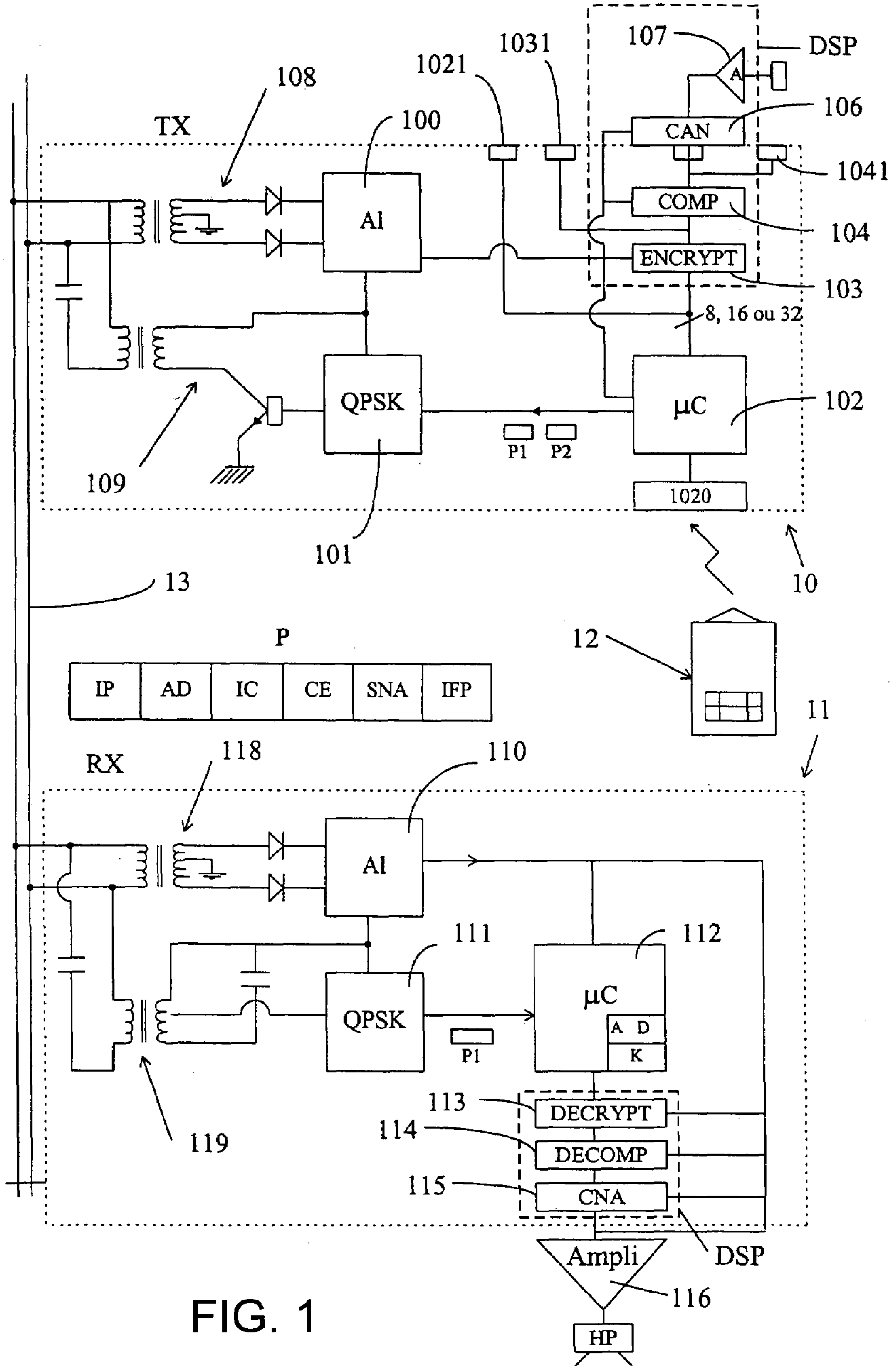
FIG. 1 represents a diagrammatic view of the electronic circuit that makes it possible to implement the invention.

The invention will now be described in connection with FIG. 1 in which reference (13) designates the two conductors of a domestic network for feeding electric energy to a building or an establishment intended to receive the public or a group, such as, e.g., a bar, a large store, a sports stadium, etc. To this electric feed network is connected a transmission device (10) comprising the primary winding of a first transformer (108) that delivers, by its secondary winding and by a diode rectification circuit, a feed signal to a feed circuit (100) that extracts, from the alternating current signal of the rectified electric network, the signals necessary to feed the various circuits of the device. In parallel, to the primary winding of this first transformer (108), there is connected a second transformer (109) whose secondary winding is fed by a transistor by a modulation circuit (101) with phase quadrature. This circuit (101) has voltage fed to it by circuit (100) and receives, from a microcontroller (102), flows of data-packets (P1, P2) that represent digital data serialized according to a protocol (P) represented below. This protocol (P) comprises a first part (IP) consisting of protocol data, a second part (AD) consisting of the address of the recipient or addresses of each of the recipients, a possible third part (IC) consisting of control information for the loudspeakers, a possible fourth part (CE) consisting of an encryption key or several keys, each for one address, a fifth part (SNA) consisting of the audio digital signal or of multiplexed audio signals, each signal being associated with an address of the recipient and finally, a sixth part (IFP) consisting of the end-of-protocol data.

The signals are modulated in phase quadrature by circuit (101) on a carrier located between 200 and 300 kHz and are superimposed on the alternating signal of the electric network by transformer (109). The digital audio signals coming from the audio source, after compression, represent a digital data speed of 128 kilobits per second and are processed by microcontroller (102) to be sent by successive packets according to protocol (EP) explained above.

Microcontroller program (102) can be adjusted to perform multiplexing of several audio sources, making it possible, e.g., to send a piece of classical music to a first loudspeaker while sending at the same moment a piece of jazz music to a second loudspeaker, each having a specific address and its own decryption key.

In this case, device (10) addresses one or more fields to a user identified by a card or a package (11) connected to the loudspeaker. Transmission device (10) and receiving device (s) (11) are not connected to each other except by electrical conductors of the domestic network for feeding electricity.

Finally, the operating program of microcontroller (102) makes it possible, when it receives commands sent by a remote control box (12) transmitting, e.g., a wave signal to a sensor (1020), to include the commands thus generated by this box (12) in the packet so as to constitute control data for the loudspeaker. These control data make it possible to individually adjust each loudspeaker by adjusting the right channel, the left channel, the base, the treble, the volume etc.

When it is desired to protect audio data being moved on the domestic network so as to make it possible to collect royalties and prevent the same musical piece being able to be heard by persons not having paid the royalties, an encryption circuit (103) is added to the device, placed between compression circuit (104) and microcontroller (102). In the case where the source of the musical signals is not of the "digital" type, an analog-digital converter (106) is connected to the device and it receives at its input the output signals of an analog amplifier (107) that receives the analog audio signals.

Receiving device (11) consists as before of a first transformer (118) making it possible, with the help of a rectification circuit, to feed a feed circuit (110) intended to generate the feed signals necessary for the operation of the various circuits of receiving device (11). A second transformer (119), connected to the primary winding of the first transformer with the help of a decoupling capacitor, feeds a demodulator (111) with phase quadrature, which provides, at its series output, the signals of the protocol and the protocol packets to a microcontroller (112) that converts these series signals into parallel signals going to a decryption circuit (113) whose output is connected to a decompression circuit (114). The output of decompression circuit (114) is itself connected to a digital-analog conversion circuit (115) whose output is intended to feed a loudspeaker (LS). The compression and decompression circuits, by an amplifier (116), use an algorithm of the "MPEG" type at level 3 and encryption circuit (103) and decryption circuit (113) use an algorithm of the "MMPP" type (Multimedia Protection Protocol).

The memory of microcontroller (112) of package (11) has stored in it the identification address that makes it possible to compare its address to the address received in the packet to identify if the digital audio data are intended for it or for another loudspeaker. Likewise, the memory of the microcontroller has stored in it, during initialization or manufacture, the decryption key. Storing the decryption key during initialization can be done thanks to a fourth zone of the protocol.

The analog-digital conversion circuits (CAD/or CDA) for encryption compression and amplification of transmitting device (10) can be made, e.g., of a digital signal processor sold by MOTOROLA under reference 563XX and generally called "D.S.P" (Digital Signal Processor).

Likewise, decryption, decompression, and digital-analog conversion circuits of receiving device (11) can be made of a digital signal processor sold by MOTOROLA under reference 563XX and generally called "D.S.P." (Digital Signal Processor).

Figure 2:
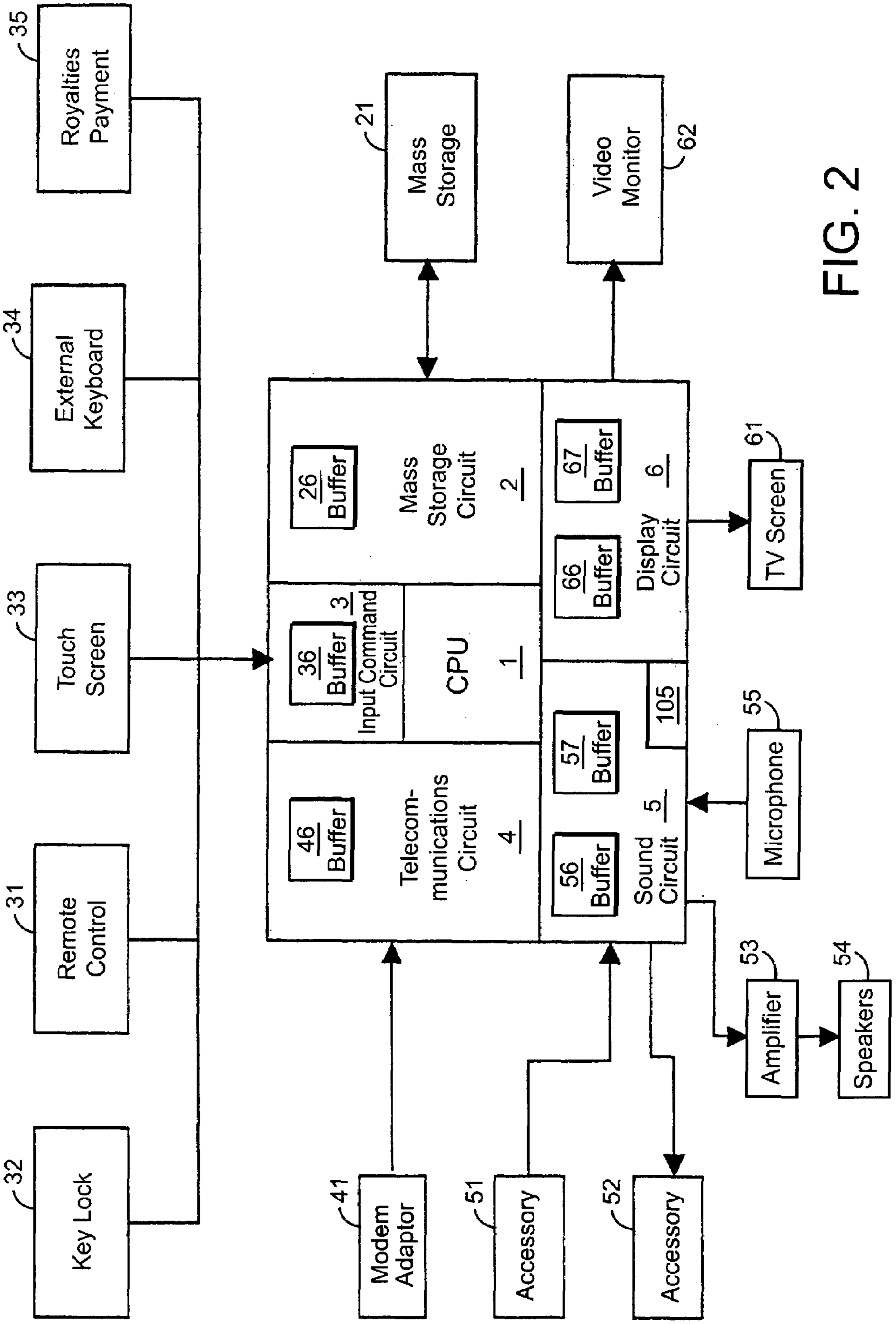
FIG. 2 represents a diagrammatic view of an audiovisual system of the "jukebox" type in which the device of the invention can be used.

Thus it can be possible, thanks to such a device, to install multiple loudspeakers in different locations provided that they be fed by the same phase of the network to which transmission device (10) will be connected. This transmission device (10) will have to be connected, on the one hand, to an audio signals source that could be, e.g., the digital output of a compact disc reader or even the digital output of a hard disc of a jukebox such as the one described in FIG. 2 and corresponding to patent application-PCT FR 95 01333 published under number WO 96/ 12 256 and, on the other hand, to conductors of the electric feed network of the building or of the establishment. The jukebox of FIG. 2 consists of a central unit (1), a microprocessor that is a system compatible with a high performance PC. When implemented, the choice went to a system of the "Intel 80486 DX/2" type that has the following storage means and characteristics:

compatibility with local bus Vesa,
cache memory of the processor: 256 kO,
high performance serial and parallel ports,
SVGA graphics adapter with microprocessor,
bus controller of the SCSI/2 type,
static, automatically fed read-write RAM memory.

Any other central unit having equivalent or higher performance could be used in the invention.

This central unit commands and manages a sound command circuit (5), a telecommunications command circuit (4), an input command circuit (3), a mass storage command circuit (2), a display means command circuit (6). The display means comprise mainly a video monitor (62) with a 14 inch (35.56 cm) flat screen without interlacing of the SVGA type with high resolution and low radiation, it is this monitor that is used to reproduce images (e.g., album covers of musical selections), graphics or video clips.

Means of mass storage (21) using high speed, high capacity, hard discs of the "SCSI" type are connected to storage means already present in the microprocessor device. These means are used to store digitized and compressed audiovisual data.

A high speed, 28.8 kpbs telecommunications modem adaptor (41) is integrated to make possible the connection with the audiovisual data distribution network controlled by a central server.

To reproduce the audio data of musical selections, the system comprises loudspeakers (54) receiving amplifier-tuner signal (53) connected to an electronic circuit (5) of the "music synthesizer" type provided to support a large number of input sources while providing an output having "CD" (compact disc) quality, such as, e.g., multimedia audio adapter with microprocessor of the "Sound Blaster card" type SBP32AWE of Creative Labs Inc. to which two memory buffers (56, 57) are added for the purpose explained later.

Likewise, the command circuit of the display means also comprises two buffer memories (66, 67) for the purpose explained below.

A distributed, thermally regulated feed of 240 watts provides the energy of the system. This feed is protected against surges and over-oscillations.

The audiovisual reproduction system manages, by its input controller circuit (3), a 14-inch (35.56 cm) tactile screen (33) "Intelli Touch" from Elo Touch Systems Inc., which includes a screen covering panel using "advanced surface wave" technology and a bus controller of the "AT" type. This tactile screen makes it possible, after having displayed on video monitor (62) or a television screen (61) various selection data used by the clients and some selection data used by the clients and command and management control data used by the manager or the proprietor of the system. It is also used for maintenance purposes in combination with an external keyboard (34) that can be connected to the system that has, for this purpose, a keyboard connector, controlled by a key lock (32) through an interface circuit (3).

Input circuit (3) also interfaces with remote control system (31) consisting of, e.g.,:

- an infrared remote control from Mind Path Technologies Inc., a transmitter that has 16 control keys for the microprocessor system and 8 control keys for the projection device,
- an infrared receiver with series adapter from Mind Path Technologies Inc.

A device for royalties payment (35) from National Rejectors Inc. is also connected to input interface circuit (3). It is also possible to use any other device that makes it possible to receive any type of payment by coins, bills, tokens, magnetic cards with chips or a combination of payment means.

To support the system, a frame or a stand made of steel with external fittings that can be personalized is provided.

Besides these elements, a wireless microphone (55) is connected to sound controller (5), which makes it possible to transform the latter into a powerful system for announcements and information intended for the public or possibly for a karaoke machine. Likewise, a wireless loudspeaker system can be used by the system.

Remote control unit (31) makes it possible for the manager, e.g., behind the bar, to access and control various commands such as:

- start-stop command for the microphone,
- mute command for the loudspeakers,
- the sound volume control command,
- the command to cancel the musical selection being listened to.

Two buffers (56, 57) are connected to sound controller circuit (5) to make it possible to store, each in alternation, data corresponding to a quarter of a second of sound. Likewise, two buffers (66, 67) are connected to video controller circuit (6) each capable alternately of storing a tenth of a second of images. Finally, a respective buffer (46, 36, 26) is connected to each communication controller circuit (4) for input (3) and storage (2) interface.

The digitized and compressed audiovisual data are stored in memory means (21).

These data are transmitted by a central unit (1) to card (105) on which elements have been added that correspond to circuit (10), encryption circuit (103) having been directly connected to buffer circuits (56, 57) in the case where the data are already compressed, either by a first connector (1021), bypassing encryption circuit (103), if the data are already encrypted or do not need to be, or by a second connector (1031) using encryption circuit (103), if the data are to be encrypted. In the case where the data are not compressed, buffers (56, 57) will be connected to a third connector (1041) to use the compression circuit.

Thus, by connecting the output of transformer (108) to the electric network, it will be possible, by connecting receiving circuits (11) at different points in the network, to feed various loudspeakers remotely, besides loudspeakers normally provided in jukebox system (54). This will make it possible to have good quality sound broadcasting in various places while assuring the manager the possibility of regulating the volumes according to the locations or according to the arrangements of the loudspeakers.

In the case where the invention is used in another device such as a compact disc reader, a radio for receiving specialized stations, etc., it is possible to equip the payment device with the help of one of the payment means mentioned above for jukebox application which, like for the jukebox, does not allow the receiving device to operate except when the royalty has been paid and for the time allotted for the royalty. This period is determined by a clock connected to the receiving device.

Other modifications within the reach of one skilled in the art are also part of the spirit of the invention.

The invention claimed is:

1. A digital transmission system for playing music through audio speakers which uses AC power lines as an audio network, comprising:

- a digital compression device for compressing digital music data into a compressed digital music data;
- a digital transmission device including a series conversion circuit for converting the compressed digital music data into series compressed digital signal packets;
- a digital modulator which controls a transmitter for transmitting the series compressed digital signal packets onto the AC power lines using one carrier frequency; and
- a digital receiver device connected to the AC power lines for receiving the transmitted packets over the AC power lines, wherein the digital receiving device includes:

a digital demodulator for demodulating the series compressed digital signal packets modulated on one carrier frequency;

a serial/parallel digital converter for converting the demodulated series compressed digital signals into demodulated parallel compressed digital signals;

a digital decompressor for decompressing the demodulated parallel compressed signals into demodulated parallel decompressed digital signals;

a digital/analog converter for converting the demodulated parallel decompressed digital signals into analog signals; and a loudspeaker for receiving the analog signals and generating music corresponding thereto;

wherein the series conversion circuit is operable to encode a destination address into the series compressed digital signal packets, and further wherein the digital receiving device is operable to compare the destination address to an address of the receiving device in order to determine if the signal is addressed to the receiving device.

2. The digital transmission system of claim 1, wherein the digital modulator is a phase quadrature digital modulator.

3. The digital transmission system of claim 1, wherein the series conversion circuit is operable to multiplex several digital files representing a different music signal intended for reception by various receiving devices having different addresses associated therewith.

4. The digital transmission system of claim 1, wherein the transmitter comprises an encryption device which encrypts the digital signal, and the receiving device includes a decryption circuit which uses a decryption key to decrypt the encrypted digital signal.

5. The digital transmission system of claim 4, wherein the digital signal is serialized according to a protocol including a part for starting protocol data, a part for an address of an intended recipient, a part for digital signal or multiplexed digital signal, and a part for ending protocol data.

6. The digital transmission system of claim 5, wherein the protocol further includes part for control data for the loudspeaker.

7. The digital transmission system of claim 6, wherein the protocol further includes a part for an encryption key for use in decrypting the digital data.

8. The digital transmission system of claim 5, wherein the protocol further includes a part for an encryption key for use in decrypting the digital data.

* * * * *